(12) United States Patent
Liu

(10) Patent No.: US 8,829,768 B2
(45) Date of Patent: Sep. 9, 2014

(54) HAPTIC FEEDBACK DEVICE

(75) Inventor: Lin Liu, Shenzhen (CN)

(73) Assignees: AAC Acoustic Technologies (Shenzhen) Co., Ltd., Shenzhen (CN); American Audio Components Inc., La Verne, CA (US)

(*) Notice: Subject to any disclaimer, the term of this patent is extended or adjusted under 35 U.S.C. 154(b) by 462 days.

(21) Appl. No.: 13/332,368

(22) Filed: Dec. 21, 2011

(65) Prior Publication Data

US 2012/0176758 A1 Jul. 12, 2012

(30) Foreign Application Priority Data

Jan. 7, 2011 (CN) .......................... 2011 1 0002750

(51) Int. Cl.
*H01L 41/09* (2006.01)

(52) U.S. Cl.
USPC .......................................... 310/348; 310/324

(58) Field of Classification Search
CPC .... H04R 17/00; H01L 41/0926; G10K 9/122; H03H 9/173; H03H 9/174
USPC ................................. 310/324, 348
See application file for complete search history.

(56) References Cited

U.S. PATENT DOCUMENTS

| 4,642,511 A | * | 2/1987 | Chason et al. | 310/348 |
| 6,629,462 B2 | * | 10/2003 | Otsuchi et al. | 73/514.34 |
| 2002/0011111 A1 | * | 1/2002 | Otsuchi et al. | 73/514.34 |

FOREIGN PATENT DOCUMENTS

| KR | 2012054869 | * | 5/2012 | ................ G06F 3/01 |
| KR | 2012063168 A | * | 6/2012 | ................ G06F 3/01 |

* cited by examiner

*Primary Examiner* — Thomas Dougherty
(74) *Attorney, Agent, or Firm* — Anova Law Group, PLLC

(57) ABSTRACT

Disclosed is a haptic feedback device used in an electronic device for providing haptic feedback. The haptic feedback device includes an electronic board defining at least two supporting elements and a receiving cavity, a piezoelectric vibrator coupling to the supporting elements and at least partially received in the receiving cavity. The piezoelectric vibrator is capable of vibrating along a direction parallel to the electronic board. At least two bolts are provided to fix the piezoelectric vibrator on the electronic board through the supporting element along a direction parallel to the electronic board.

17 Claims, 2 Drawing Sheets

HAPTIC FEEDBACK DEVICE

FIELD OF THE INVENTION

The present invention generally relates to the art of piezoelectric vibrators, more particularly to a piezoelectric vibrator used in an electronic device having a screen.

RELATED ART OF THE INVENTION

Gradually, piezoelectric vibrators are widely used in many types of electronic devices having screens, such as mobile phones, for providing tactile vibration.

Generally, a piezoelectric vibrator includes a diaphragm, and a pair of piezoelectric layers separately attached to two sides of the diaphragm. In order to provide vibration to the screen of the electronic device, one end of the piezoelectric vibrator contacts an edge of the screen. However, it is difficult to couple the piezoelectric vibrator with the screen. Even if the piezoelectric vibrator is coupled with the screen, the contacting relationship therebetween is not stable. Further, during the vibration of the vibrator, the screen may be damaged by the contacting end of the piezoelectric vibrator.

Therefore, an improved piezoelectric vibrator that can resolve the problems mentioned-above is desired.

DETAILED DESCRIPTION OF THE EXEMPLARY EMBODIMENT

Reference will now be made to describe one exemplary embodiment of the present invention in detail.

Figure 1:
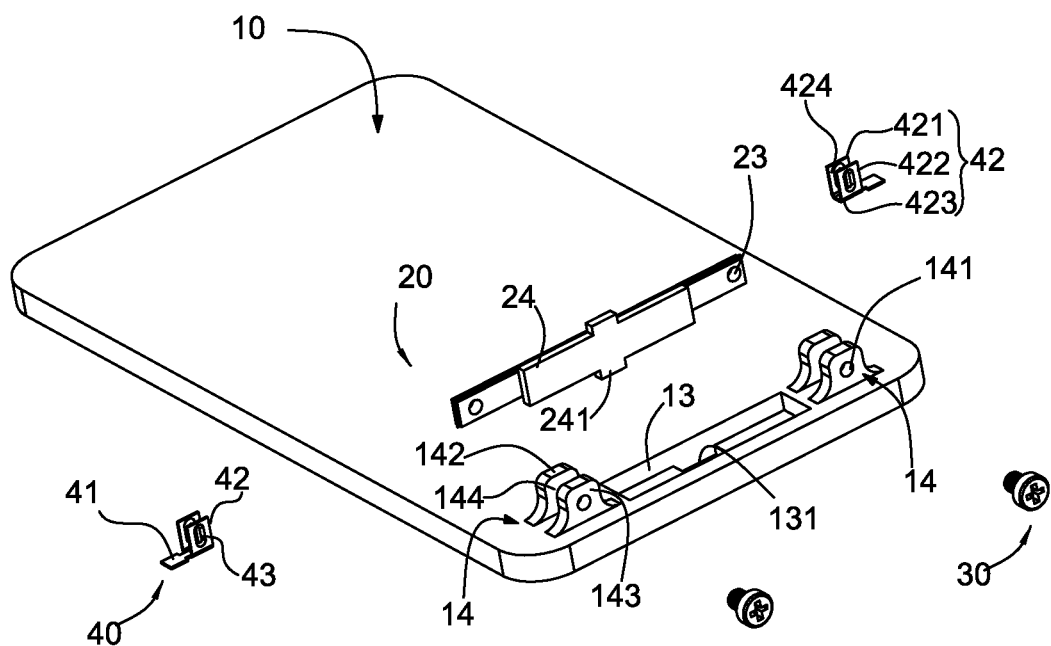
FIG. 1 is an illustrative exploded view of an electronic board having a piezoelectric vibrator in accordance with an exemplary embodiment of the present invention.
Figure 2:
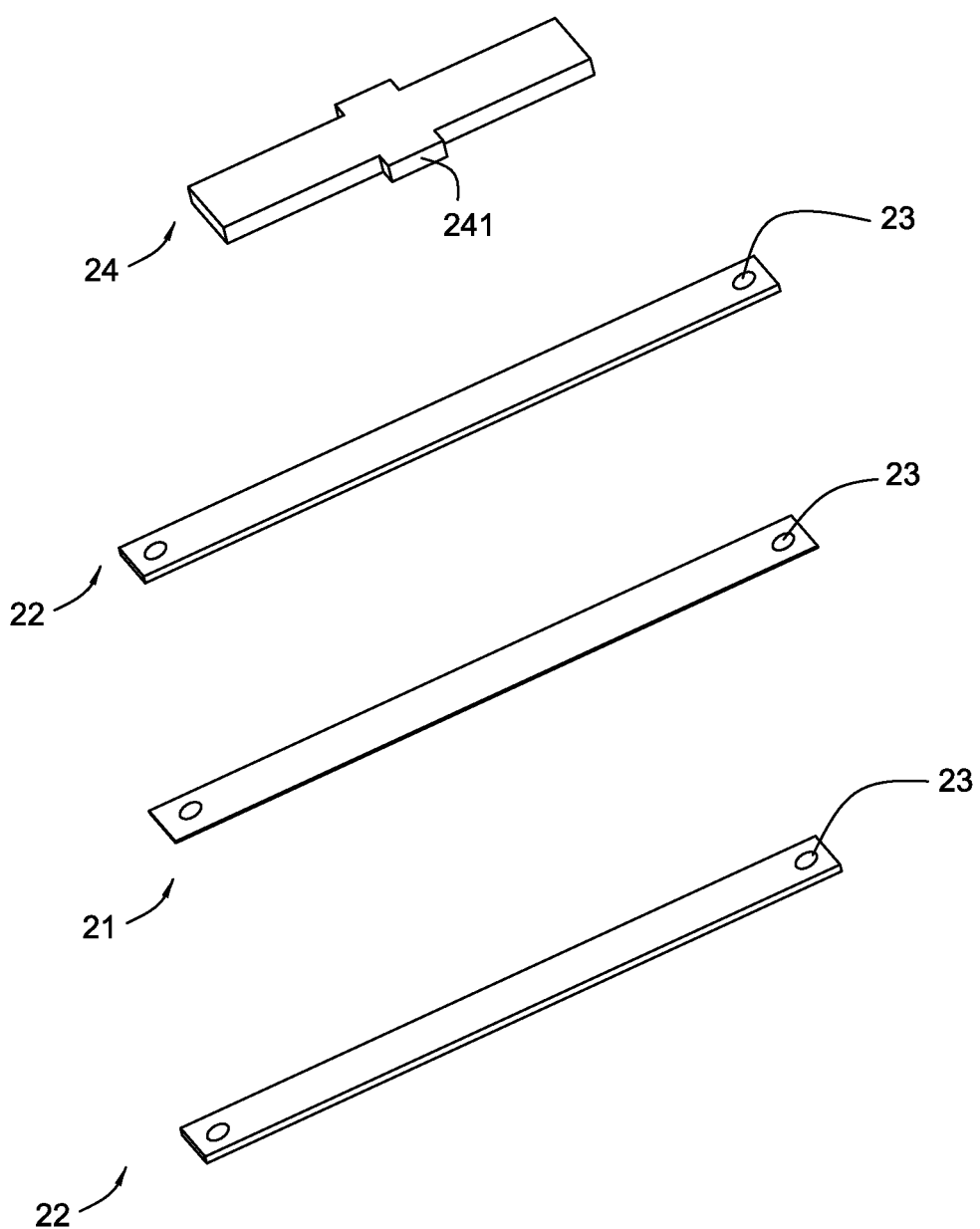
FIG. 2 depicts an isometric exploded view of the piezoelectric vibrator in FIG. 1.

Referring to FIGS. 1-2, a haptic feedback device for providing haptic feedback, in accordance with an exemplary embodiment of the present invention, includes a piezoelectric vibrator 20. In the exemplary embodiment of the present invention, the piezoelectric vibrator 20 is mounted and fixed with an electronic board 10. The haptic feedback device further comprises a pair of contacts 40 electrically connected the piezoelectric vibrator 20 with the piezoelectric vibrator 20. A piezoelectric vibrator is a type of electric motor based upon the change in shape of a piezoelectric material when an electric field is applied. The electronic board 10 may be constructed as a mobile phone or other consumer electronic device having a screen. The electronic board 10 can also be construed as a screen. The piezoelectric vibrator 20 contacts a surface of the screen for effectively transferring vibration to the screen.

A pair of supporting elements 14 extending from a surface of the electronic board 10 is provided. The electronic board 10 has a receiving cavity 13 caving from a surface of the electronic board 10 and located between the pair of supporting elements 14. In the exemplary embodiment, each of supporting element 14 defines a first supporting plate 142, a second supporting plate 143 opposite to the first supporting plate 142, and a gap 144 formed between the first supporting plate 142 and the second supporting plate 143. Further, each of the first supporting plate 142 and the second supporting plate 143 defines a first supporting hole 141, respectively. The receiving cavity 13 further defines a restricting aperture 131.

Furthermore, each of the gaps 144 receives one contact 40 therein. Each of contacts 40 includes a welding plate 41 and a binder 42 defining a first connecting plate 421, a second connecting plate 422 parallel to the first connecting plate 421, and a coupling plate 423 for connecting the first connecting plate 421 and the second connecting plate 422. The welding plate 41 is coplanar with the coupling plate 423. A slot 424 is formed by the first connecting plate 421, the second connecting plate 422 and the coupling plate 423. Each of the first connecting plate 421 and the second connecting plate 422 defines a second supporting hole 43, respectively.

The piezoelectric vibrator 20 includes a diaphragm 21, and two piezoelectric layers 22 attached to the diaphragm 21. The diaphragm 10 defines a rectangular body including a first surface and a second surface opposite to the first surface. The two piezoelectric layers 22 are separately attached to the first surface and second surface. The piezoelectric vibrator 20 further comprises a weight 24 attached to a surface of one piezoelectric layer 22. The weight 24 defines a protrusion 241 corresponding to the restricting aperture 131. Two ends of the piezoelectric vibrator 20 defines a third fixing holes 23 corresponding to the first fixing hole 141, respectively. In the exemplary embodiment, in order to restrict the vibrating direction of the piezoelectric vibrator 20, the weight 24 is received in the receiving cavity 13 and the protrusions 241 located in the restricting aperture 131. In the present exemplary embodiment, the piezoelectric vibrator 20 is capable of vibrating along a direction parallel to a surface of the electronic board 10 where the piezoelectric vibrator 20 is mounted on. The piezoelectric vibrator 20 is sandwiched between the first supporting plate 142 and second supporting plate 143. In other words, two ends of the piezoelectric vibrator 20 are received the slot 424 of the contacts 40. The welding plate 41 electrically contacts a surface of the electronic board 10. The binder 42 of the contacts 40 is located in the gap 144. A pair of bolts 30 is assembled to the supporting elements 14 so that the piezoelectric vibrator 20 is firmly mounted on the supporting element 14 by the bolts 30. The bolts 30 pass through the first supporting hole 141, the second supporting hole 43 and the third fixing holes 23 of the piezoelectric vibrator 20. The bolts 30 serve as a screw bolt. The first supporting hole 141 defines whorls corresponding to the screw bolts.

The piezoelectric vibrator 20 is a type of electric motor based upon the change in shape of a piezoelectric material when an electric field is applied. Piezoelectric vibrators make use of the converse piezoelectric effect whereby the material produces vibrations in order to produce a motion. In the exemplary embodiment, the two piezoelectric layers 22 are ceramic sintered bodies. And, electrodes are provided between the diaphragm 21 and the two piezoelectric layers 22 for providing electric field to the two piezoelectric layers 22. When an electric field is applied, the two piezoelectric layers 22 make use of the converse piezoelectric effect to produce vibration.

When assembled in the electronic device, the piezoelectric vibrator 20 is mounted and fixed on the electronic board 10 by the bolts 30 through the first supporting holes 141 in the supporting elements, the second supporting holes 43 of the contact 40, and the third fixing holes 23 of the piezoelectric vibrator 20. The weight 24 is at least partially received in the receiving cavity 13, and the protrusion 241 is at least partially accommodated in the restricting aperture 131. In order to avoid scraping on the electronic board 10, other part of the piezoelectric vibrator 20 keeps a distance from the electronic board. The piezoelectric vibrator 20 can be assembled to the screen only with one edge thereof contacted to a bottom of the screen. And, when electrified, the piezoelectric vibrator 20 vibrates along a direction parallel to the electronic board 10, whereby, the screen is activated to vibrate to provide haptic feedbacks.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. A haptic feedback device comprising:
an electronic board defining at least two supporting elements, a receiving cavity located between the supporting elements;
a piezoelectric vibrator coupling to the supporting elements and at least partially received in the receiving cavity, the piezoelectric vibrator being capable of vibrating along a direction parallel to the electronic board;
at least two contacts corresponding to the supporting elements and electrically connected the piezoelectric vibrator with the electronic board;
at least two bolts fixing the piezoelectric vibrator on the electronic board through the supporting element along a direction parallel to the electronic board.

2. The haptic feedback device as described in claim 1, wherein each of the supporting elements comprises a first supporting plate, a second supporting plate opposite to the first supporting plate and a gap formed between the first supporting plate and the second supporting plate, each of the first supporting plate and the second supporting plate further comprises a first supporting hole for cooperating with the bolts.

3. The haptic feedback device as described in claim 2, wherein each of the contacts defines a welding plate mounted on the electronic board and a binder, the binder is located in the gap and further defines a first connecting plate, a second connecting plate parallel to the first connecting plate, and a coupling plate for connecting the first connecting plate and the second connecting plate for forming a slot therebetween, each of the first connecting plate and the second connecting plate further comprises a second supporting hole for cooperating with the bolts.

4. The haptic feedback device as described in claim 3, wherein a part of the piezoelectric vibrator is received in the slot, and the piezoelectric vibrator defines a third fixing hole for cooperating with the bolts.

5. The haptic feedback device as described in claim 4, wherein the piezoelectric vibrator comprises a diaphragm and two piezoelectric layers attached to the diaphragm, each of piezoelectric layers and the diaphragm is substantially perpendicular to the electronic board.

6. The haptic feedback device as described in claim 5, wherein the piezoelectric vibrator further defines a weight mounted on one of the piezoelectric layers, the weight is at least partially received in the receiving cavity.

7. The haptic feedback device as described in claim 5, wherein the receiving cavity further defines a restricting aperture, and the weight further comprises a protrusion at least partially accommodated in the restricting aperture.

8. The haptic feedback device as described in claim 2, wherein the first supporting hole defines whorls corresponding to the bolts.

9. A haptic feedback device comprising:
an electronic board defining a receiving cavity caving from a surface thereof;
a piezoelectric vibrator assembled with the electronic board with two ends thereof fixed to the electronic board;
a contact electrically connecting the piezoelectric vibrator with the electronic board; wherein
a middle portion of the piezoelectric vibrator is partially received in the receiving cavity, and other part of the piezoelectric vibrator keeps a distance from the surface of the electronic board.

10. The haptic feedback device as described in claim 9, wherein the piezoelectric vibrator further comprises a weight located on a middle portion thereof, the weight being partially received in the receiving cavity.

11. The haptic feedback device as described in claim 10, wherein the weight further defines a protrusion, and the receiving cavity further defines a restricting aperture for at least partially receiving the protrusion therein.

12. The haptic feedback device as described in claim 9, wherein the electronic board further comprises a pair of supporting elements protruding from the surface for engaging with the two ends of the piezoelectric vibrator.

13. The haptic feedback device as described in claim 12, wherein the haptic feedback device further comprises at least two bolts fixing the piezoelectric vibrator on the electronic board through the supporting element along a direction parallel to the electronic board.

14. The haptic feedback device as described in claim 13, wherein each of the supporting elements comprises a first supporting plate, a second supporting plate opposite to the first supporting plate and a gap formed between the first supporting plate and the second supporting plate, each of the first supporting plate and the second supporting plate further comprises a first supporting hole for cooperating with the bolts.

15. The haptic feedback device as described in claim 14, wherein each of the contacts defines a welding plate mounted on the electronic board and a binder, the binder is located in the gap and further defines a first connecting plate, a second connecting plate parallel to the first connecting plate, and a coupling plate for connecting the first connecting plate and the second connecting plate for forming a slot therebetween, each of the first connecting plate and the second connecting plate further comprises a second supporting hole for cooperating with the bolts.

16. The haptic feedback device as described in claim 15, wherein a part of the piezoelectric vibrator is received in the slot, and the piezoelectric vibrator defines a third fixing hole for cooperating with the bolts.

17. The haptic feedback device as described in claim 10, wherein the piezoelectric vibrator comprises a diaphragm and two piezoelectric layers attached to the diaphragm, each of piezoelectric layers and the diaphragm is substantially perpendicular to the electronic board, the weight mounted on one of the piezoelectric layers.

* * * * *